US005809769A

United States Patent [19]

Richards et al.

[11] Patent Number: 5,809,769

[45] Date of Patent: Sep. 22, 1998

[54] COMBUSTOR OSCILLATION ATTENUATION VIA THE CONTROL OF FUEL-SUPPLY LINE DYNAMICS

[75] Inventors: George A. Richards; Randall S. Gemmen, both of Morgantown, W. Va.

[73] Assignee: The United States of America as represented by the United States Department of Energy, Washington, D.C.

[21] Appl. No.: 744,644

[22] Filed: Nov. 6, 1996

[51] Int. Cl.$^{6}$ .......... F02C 9/26

[52] U.S. Cl. .......... 60/39.06; 60/725; 431/114

[58] Field of Search .......... 60/39.06, 39.76, 60/39.81, 725; 431/1, 114

[56] References Cited

U.S. PATENT DOCUMENTS

| | | | |
|---|---|---|---|
| 5,015,171 | 5/1991 | Zinn et al. | 431/1 |
| 5,372,008 | 12/1994 | Sood . | |
| 5,428,951 | 7/1995 | Wilson et al. | 60/725 |
| 5,445,517 | 8/1995 | Kondou et al. | 431/1 |
| 5,544,478 | 8/1996 | Shu et al. | 60/725 |

OTHER PUBLICATIONS

"Convective Heat Transfer in a Gas–Fired Pulsating Combustor", V. I. Hanby, Journal of Engineering for Power, Jan., 1969, pp. 48–52.

"Investigation of Pulsating Combustion in Operation of the GT–100–750–2 Combustion Chambers on Gaseous Fuel", A. A. Tarkanobskii et al, Teploenergetika, vol. 22(6), 1975, pp. 29–32.

*Primary Examiner*—Louis J. Casaregola
*Attorney, Agent, or Firm*—Lisa A. Jarr; Stephen D. Hamel; William R. Moser

[57] ABSTRACT

Combustion oscillation control in combustion systems using hydrocarbon fuels is provided by acoustically tuning a fuel-delivery line to a desired phase of the combustion oscillations for providing a pulse of a fuel-rich region at the oscillating flame front at each time when the oscillation produced pressure in the combustion chamber is in a low pressure phase. The additional heat release produced by burning such fuel-rich regions during low combustion chamber pressure effectively attenuates the combustion oscillations to a selected value.

9 Claims, 4 Drawing Sheets

COMBUSTOR OSCILLATION ATTENUATION VIA THE CONTROL OF FUEL-SUPPLY LINE DYNAMICS

BACKGROUND OF THE INVENTION

The invention relates generally to the apparatus and method for controlling combustion oscillations in combustion systems and, more particularly, to the reduction of undesirable high dynamic pressure oscillations in a combustion chamber to acceptably lower levels by utilizing an acoustically tunable fuel-delivery system for promoting a greater heat release in the combustion chamber during each low pressure segment of the pressure oscillations. The U.S. government has rights in this invention pursuant to an employer-employee relationship of the U.S. Department of Energy and the inventors.

Combustion systems such as used in conjunction with gas turbines and steam-generators commonly utilize a hydrocarbon fuel with air in a substantially stoichiometric ratio in an associated combustion chamber for the generation of sufficient heat energy to drive the turbine or generate steam. The burning of hydrocarbon fuels in such applications are known to produce exhaust emissions which are environmental pollutants. Efforts to reduce these environmental polluting emissions include pre-mixing the fuel and air prior to introducing the mixture into the combustion chamber. Also, the use of such pre-mixes in a so-called lean pre-mix where the volume of fuel is less than that required to be in a stoichiometric ratio with the available air, provides for a reduction in the emission of nitrogen oxides. A typical combustion system using a lean pre-mix is described in U.S. Pat. No. 5,372,008, which issued Dec. 13, 1994, and which is incorporated herein by reference.

While the use of lean pre-mixes of a hydrocarbon fuel and air has been successful in reducing the emissions of environmental pollutants so as to alleviate the impact of these emissions on the environment, it has been found that combustion instability in the form of dynamic pressure oscillations occurs in combustion systems using such pre-mixes. As indicated by Rayleigh's criteria, "Theory of Sound", Volume II, No. 8, Dover, N.Y., 1945, the amplitude of the oscillations in the combustion chamber will be the strongest when the pressure wave is in-phase with the periodic heat release produced by the combustion of the fuel-air mixture. These dynamic pressure oscillations are frequently of a sufficiently high magnitude so as to produce undesirable operating conditions including the reduction of the useful life of the combustion system components due to structural fatigue, vibrations, and cycling fatigue.

A recent development found to satisfactorily suppress high-amplitude pressure oscillations in hydrocarbon-fueled combustion systems is described in assignee's copending patent application entitled, "Combustor Oscillating Pressure Stabilization and Method", Mui Tong Joseph Yip et al, Ser. No. 08/644,609, filed Apr. 26, 1996. In this copending patent application, the active control of unsteady combustion induced oscillations in a combustion chamber fired by a suitable fuel and oxidizer mixture, such as formed of a hydrocarbon fuel and air, is provided by restructuring and moving the position of the main flame front to increase the transport time and displace the pressure wave further away from the in-phase relationship with the periodic heat release. The restructuring and the repositioning of the main flame front are achieved by utilizing a pilot flame which is pulsed at a predetermined frequency corresponding to less than about one-half the frequency of the combustion oscillation frequency. The duration of each pilot-flame pulse is sufficient to produce adequate secondary thermal energy to restructure the main flame and thereby decouple the heat release from the acoustic coupling so as to lead to a reduction in the dynamic pressure amplitude. The pulsating pilot flame produces a relatively small and intermittently existing flame front in the combustion zone that is separate from the oscillating main flame front but which provides sufficient thermal energy to effectively reposition the location of the oscillating main flame front out of the region in the combustion zone where the acoustic coupling can occur with the main flame and thereby effectively altering the oscillation causing phase relationship with the heat of combustion. This copending patent application and the publications referenced therein are incorporated herein by reference.

The controlling of high-amplitude combustion oscillations resulting from the unsteady combustion of hydrocarbon fuels has also been achieved by selectively altering the acoustic behavior of the combustion chamber. By so tuning structural components defining the combustor chamber, such as the combustion chamber walls, the pressure oscillations can be reduced. This technique is described in the publication, "*Convective Heat Transfer in a Gas-Fired Pulsating Combustor*", V. I. Hanby, Journal of Engineering for Power, January, 1969, pp 48–52.

In addition to unsteady combustion operations causing high-amplitude pressure oscillations to occur during the operation of combustion systems such as described above, it has been found that these oscillations are usually transmitted from the combustor chamber into the portion or section of the fuel-delivery system that is attached to and in close proximity to the combustion chamber. These so-transmitted oscillations are of essentially the same frequency as those occurring in the combustion chamber and are responsible for producing fluxuations in the fuel feed flow rate to the combustion chamber. As reported in the publication entitled, "*Investigation of Pulsating Combustion in Operation of the GT*-100-750-2 *Combustion Chambers on Gaseous Fuel*", A. A. Tarkanobskii et al, Teploenergetika, Vol. 22 (6) 1975, pp 29–32, fluxuations in high pressure combustion chambers have been found to induce corresponding high pressure fluxuations in the fuel in the fuel line at frequencies substantially similar to one another but almost opposite in phase. These oscillations of the same frequencies with the 180° phase shift between the pressures in the combustion chamber and the fuel line indicate that unstable combustion in the combustion chamber is influenced by these oscillations on the fuel present in the fuel line. As described in this last-mentioned publication, one method of suppressing combustion oscillations due to oscillation induced fluxuations in the fuel-delivery line is by utilizing fuel-discharging nozzles which have outlet holes of smaller areas than used in conventionally employed injectors.

SUMMARY OF THE INVENTION

While active control techniques for reducing or suppressing undesirable pressure oscillations in combustion systems fired with a suitable hydrocarbon fuel and oxidizer such as air described above and in the publication referenced in assignee's aforementioned copending patent application may satisfactorily reduce combustion oscillations, it is the primary objective or goal of the present invention to provide a further and improved active control apparatus and method for effecting the stabilization of unsteady combustion oscillating pressures in combustion chambers fired with hydrocarbon fuels.

As briefly described above, pressure oscillations occur in a combustion chamber where the heat release due to combustion is in phase with the pressure oscillation. Such situations can arise from a variety of conditions. The present invention is intended to attenuate all modes of combustion instability by deliberately producing pockets of fuel that can arrive at the flame in the combustion chamber when the pressures therein are relatively low. This feature of the present invention will act against the in-phase combustion and thereby reduce the combustion instability.

More precisely, in the present invention the control of unsteady combustion induced oscillations in a combustion chamber fired by a suitable fuel and oxidizer mixture such as formed of a liquid or gaseous hydrocarbon fuel and air, is provided by introducing fuel-rich regions of this combustible mixture at the flame front of the combustion oscillation at a time when the pressure of the oscillation is at the low-pressure segment thereof. The burning of these fuel-rich regions produce a relatively large heat release when each pressure oscillation or wave is at the low-pressure portion or segment of the pulse or oscillation to significantly attenuate the pressure oscillations. Generally, this goal of the present invention is achieved by acoustically tuning the fuel supply line so that each pressure wave generated in the main combustion chamber creates an oscillation variance in the fuel contained in the supply line to effectively create a fuel-rich region at the fuel line exit or fuel injection nozzle of the fuel-delivery line that will be transported to and arrive at the flame front at a time when the pressure in the combustion chamber produced by oscillation is in a low, preferably the lowest, pressure phase.

The apparatus of the present invention utilized for reducing the amplitude of dynamic pressure oscillations occurring in the combustion chamber of a combustion system and the one or more fuel-delivery means associated with the combustion zone comprises movable means coupled to the at least one fuel-delivery means for providing a change in position of a movable body providing stepped change in the cross-sectional area of the fuel-delivery means to sufficiently alter the phase of the oscillations produced in the fuel in the fuel-delivery means to a selected phase capable of providing a fuel-rich region of a fuel-oxidizer mixture at one end of the combustion zone at a time when the pressure of each of the pressure oscillations occurring in the combustion zone due to unsteady combustion is at a relatively low stage or segment. The phase-altering movable means are provided by movable acoustic tuning means coupled to the at least one fuel-delivery means, preferably at a location near the combustion chamber where the at least one fuel-delivery means is subjected to oscillations produced in the combustion chamber. One form of the movable tuning means is provided by forming a portion of the fuel-delivery means of first tubing and second tubing means with a section of the second tubing means being telescopically receivable within a section of the first conduit means whereby a hard surface region defined at and by an end region of the second conduit means can be selectively translated within the section of the first tubing means for altering the length of the acoustically excited tube therein and thereby changing the phase of the oscillations in the fuel in the at least one fuel-delivery means to the aforementioned selected phase.

Alternatively, the acoustic tuning means can be provided by coupling non-fuel conveying and telescopically receivable first and second conduit sections to a fuel conveying segment of the fuel-delivery means with the volume or cross-sectional area of the first conduit section defining a portion of the cross-sectional area of the fuel-delivery means. The selective translation of the second conduit section within the first conduit section serves to change the cross-sectional area of the fuel-delivery means and thereby provide the desired oscillation phase therein.

The method of the present invention for reducing the amplitude of the pressure oscillations in the combustion zone is achieved by the step of changing the phase of the fluid oscillations produced in the at least one fuel-delivery means to a selected phase sufficiently different from the phase of the oscillations concurrently produced in the combustion zone so that a fuel-rich region of the fuel-air mixture is produced for introduction into the combustion zone each time the pressure of the pressure oscillation in the combustion zone is at a relatively low level or state. This step of changing the phase of the fluid oscillations in the fuel conveying means is provided by selectively altering or varying the effective length of a section of the fuel-delivery means, preferably by the translation of a cross-sectional area-changing and phase-altering hard surface means within a section of the fuel-delivery means in which the contained fuel is subjected to oscillations generated in the combustion zone. Alternatively, the translation of the cross-sectional area changing hard surface means can be provided in a conduit system openly coupled to this section of the fuel-delivery means. The acoustical tuning of the at least one fuel-delivery means at some controlled phase permits different levels or rates of the fuel mixture to be supplied to the combustion chamber over time. Thus, since the equivalence ratio of the fuel entering the combustion chamber [$\phi$] is a function of time $\phi(t)$ where the dominant oscillation $\phi$ will occur at the same frequency as the large load oscillation in the combustion chamber, the modulation in $\phi$ over time causes the level of control to be selectively achievable to effectively attenuate the pressure oscillations in the combustion chamber to the desired level.

This tuning of the fuel-delivery system is a significant improvement over combustor tuning techniques as previously employed such as described above since the acoustic behavior of the fuel line can be readily changed by using hardware coupled to the combustion system at locations remote to the hot surfaces and gases of the combustion chamber. Further, the objective of the present invention is achieved by using hardware that is relatively inexpensive and space efficient as compared to the more costly and bulkier mechanisms described in the aforementioned publications.

Other and further objects of the present invention will become obvious upon an understanding of the illustrative embodiment and method about to be described or will be indicated in the appended claims, and various advantages not referred to herein will occur to one skilled in the art upon employment of the invention in practice.

Preferred embodiments of the invention have been chosen for the purpose of illustration and description. The preferred embodiments illustrated are not intended to be exhaustive nor to limit the invention to the precise forms shown. The preferred embodiments are chosen and described in order to best explain the principles of the invention and their application and practical use to thereby enable others skilled in the art to best utilize the invention in various embodiments and modifications as are best adapted to the particular use contemplated. Also, while the combustion chambers illustrated in these drawings are somewhat limited in detail, it will appear clear that the particular construction and operational details of the combustion chamber are not critical since the present invention can be utilized in any straight-line system of a fuel line connected to any combustion chamber of essentially any configuration in which the high-pressure oscillations are produced during the combustion process and wherein one or more of the fuel-delivery lines to the pilot chamber and/or the main combustion chamber can be tuned in accordance with the present invention for the reduction of the combustion oscillations.

DETAILED DESCRIPTION OF THE INVENTION

As generally described above, the operation of combustion systems in certain modes often contributes or is directly responsible for the formation of undesirable unsteady combustion-induced oscillations in a combustion chamber of a combustion system fired by a hydrocarbon fuel in the presence of a suitable oxidizer. These oscillations may be of such high pressure and amplitude so as to substantially reduce the efficiency of a combustion system as well as to the significantly shorten the expected life of various combustion system components due to oscillation-induced vibrations and cyclic failures. The reinforcement and the strengthening of these pressure oscillations occurs and the pressure oscillations are the strongest when heat released due to the combustion of the fuel-oxidizer mixture is in phase with the peak or highest pressure phase of each pressure wave. These combustion induced pressure oscillations propagate from the combustion chamber into the conduit system defining the fuel-delivery system. Oscillations in the fuel system may contribute to the variations in the heat release, or may mitigate this variation depending on the phase of when such fuel variations arrive at the flame front.

Figure 1:
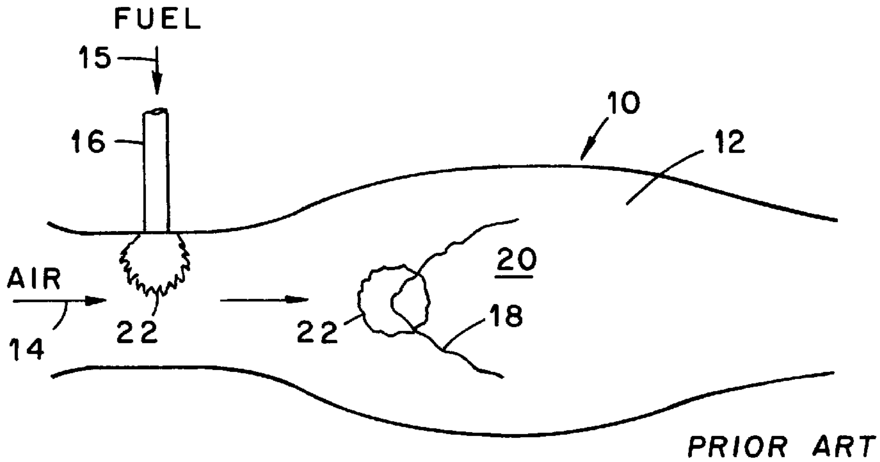
PRIOR ART Fig. 1
FIG. 1 is a schematic illustration of a combustion system showing one particular mode of unsteady combustion oscillations generated in the combustion chamber thereof and flow oscillations induced in the fuel-delivery lines such as previously produced by the transport of fuel-rich regions of the fuel-oxidizer mixture to the oscillating flame front and the burning of such a fuel-rich region during the peak pressure of each oscillation.
Figure 2:
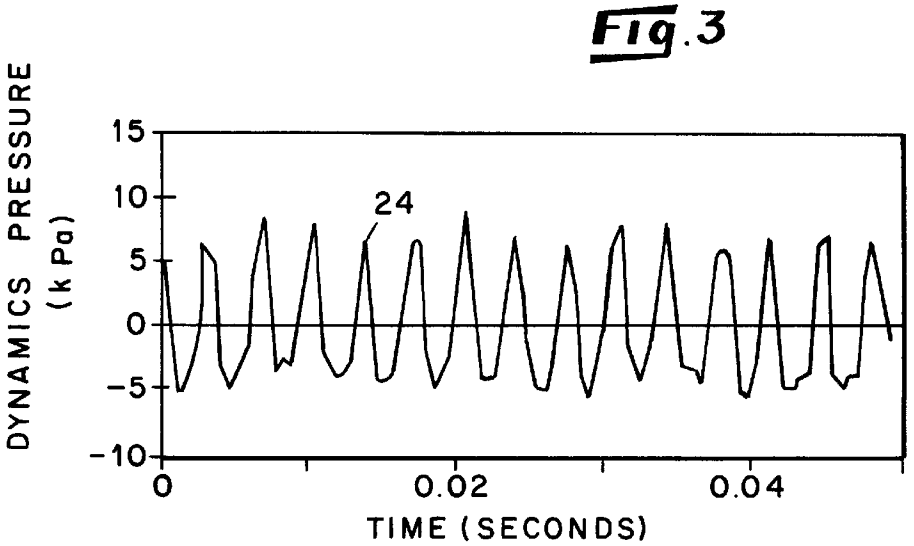
PRIOR ART Fig. 2
FIG. 2 is a graph illustrating the pressure oscillations such as would occur in a combustion chamber such as shown in FIG. 1 and operating under unsteady combustion conditions.

The operation of a typical combustion system under one type of unsteady burn is shown in FIGS. 1 and 2 where the combustion system 10 conventionally includes a combustion chamber 12 coupled to an oxidizer supply (not shown) for receiving a gaseous stream 14 of the oxidizer and to a fuel supply (not shown) for receiving a stream of fuel 15 via a fuel-delivery line or conduit 16. The stream of fuel 15 is typically injected into the oxidizer stream 14 through a suitable injection or nozzle mechanism (not shown) to form a combustible mixture of fuel and air at a desired stoichiometric ratio. The fuel forming the stream 15 is normally provided by a hydrocarbon fuel in a gaseous or liquid form while the oxidizer in stream 14 is usually air but can be of any other suitable combustion supporting medium such as oxygen, oxygen-enriched air, or any other useable oxygen containing gas or gases.

In the operation of the combustion system 10, the combustible fuel-oxidizer mixture is fired by any suitable means such as a pilot flame, glow plug, or a spark ignition device to establish and maintain a main flame front such as generally indicated by the line 18 in the combustion zone 20 of the combustion chamber 12. This combustion of the fuel-oxidizer mixture does not usually, especially when using a fuel-lean pre-mix, provide a steady state burn, but instead produces an unsteady burn forming intermittent pressure waves and periodic heat releases which cause the flame front 18 to longitudinally oscillate within the combustion zone 20. The oscillating flame front is defined by sine-like pressure waves which have peak high pressure phases or segments separated by low pressure phases or segments as shown by the curve in FIG. 2.

As pointed out above, these combustion oscillations also propagate into the fuel-delivery line 16 at locations near the coupling thereof with the combustion chamber 12 to produce oscillations in the fuel contained in the fuel line 16. These induced oscillations so influence the delivery of the fuel from the fuel line 16 so as to cause a pulse of a fuel-rich region of the fuel-oxidizer mixture such as shown at 22 to be delivered to the flame front 18. The curve 24 in FIG. 2 illustrates an oscillating pressure as would occur in a combustion chamber undergoing an unsteady burn which is at least partially caused by the delivery of fuel-rich regions of the combustible mixture into the combustion chamber at a time of peak pressures therein.

Figure 3:
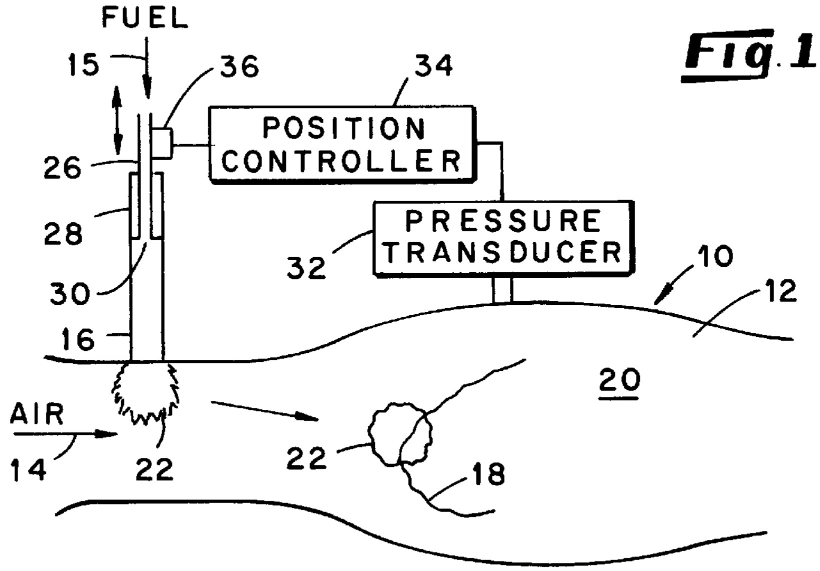
FIG. 3 is a schematic illustration of a combustion system arrangement similar to that shown in FIG. 1 but provided with means for acoustically tuning the fuel-delivery line to effectively alter the phase of the oscillations in the fuel-delivery line and thereby force fuel-rich regions to arrive and burn at the oscillating flame front when the pressure in the combustion chamber as provided by each oscillation is low.
Figure 4:
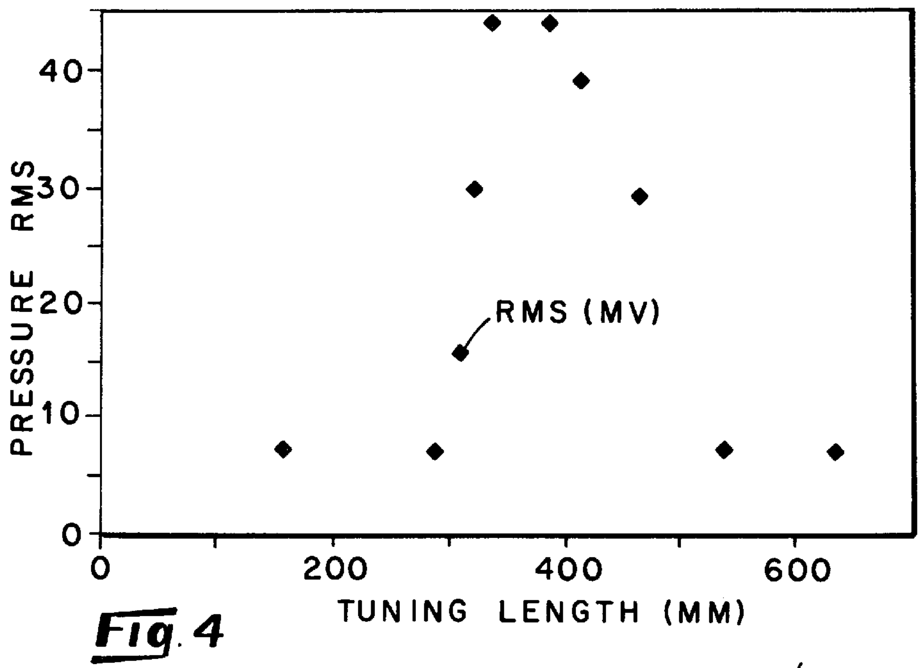
FIG. 4 is a graph illustrating the amplitude of the pressure oscillations in root mean square (RMS) as would occur in a combustion chamber such as shown in FIG. 3 when the fuel-delivery line is tuned by varying the effective length (mm) thereof in accordance with the present invention.

In accordance with the present invention and as generally shown in FIGS. 3 and 4 the oscillations induced into the fuel contained in the fuel-delivery line 16 are so modified so as to provide for the transport of fuel-rich regions or pulses 22 of the fuel-air mixture to the oscillating flame front at a time when the pressure in the combustion zone is in the low rather than the high pressure phase of the oscillation. The heat energy resulting from the burning of the fuel-rich regions during each low pressure phase of the oscillations effectively attenuates the amplitude of the oscillations pursuant to the Rayleigh principle discussed above. The present invention provides for selectively varying the phase of the oscillations acting on the fuel in the fuel-delivery line by acoustically tuning the fuel-delivery line to controllably adjust the wavelength of the oscillations induced therein to a wavelength effective to provide for the desired timing of the transport of the fuel-rich regions of the fuel-oxidizer mixture to the flame front. This control technique will work to attenuate the oscillations of any type of combustion instability.

As generally shown in FIG. 3, the selective acoustic tuning of the fuel-delivery line 16 is achieved by the desired positioning of a translatable hard surface region in a section of the fuel line 16 coupled to the combustion system to change the acoustic behavior of this fuel line section. This changing of the acoustic behavior is achieved by using a telescopic conduit arrangement in or coupled to the fuel-delivery line 16 whereby one component or section 26 of the fuel line 16 is telescopically received in a contiguous larger diameter component or section 28 that is connected to the combustion system 10 and in which the fuel 15 undergoes the induced oscillations. By selectively telescopically positioning the fuel line sections one within the other a translatable hard surface region 30 defined by the leading or free-end region of the smaller diameter fuel line section 26 effectively changes the effective length within the larger diameter fuel line section 28 to alter the phase of the oscillations occurring in the fuel line section 28 to a desired phase or wavelength.

The extent of the change in the effective length of the fuel line section 28 provided by the telescopic positioning of the fuel line sections 26 and 28 determines how the fuel 15 inside the fuel line section 28 responds to the pressure waves generated in and traveling through the combustion chamber 12 so that fuel-rich regions of the combustible mixture are each created at a location adjacent to the nozzle or injector of the fuel-delivery line 16 at a time wherein the transport of the fuel-rich region to the flame front and the resulting burning will occur when the pressure in the combustion chamber is in a low pressure phase. As shown in FIG. 4, the selective positioning of these fuel line sections 26 and 28 provides the fuel line section 28 with various tuning lengths (mm) which permit the effective tuning of the fuel line 28 so that the pressure (RMS) of the oscillations in the combustion chamber 12 can be readily controlled and reduced to any suitable operational level.

The positioning of the fuel line section 26 in fuel line section 28 to provide for the desired area-changing translation of the hard surface region 30 can be achieved in any suitable manner such as manually or by using an automatic control arrangement. For example, as shown in FIG. 3, the tuning of the fuel line 16 can be automatically achieved by coupling a pressure transducer 32 to the combustion chamber 12 for generating signals indicative of the combustion pressure and then using the resulting signals in a suitable controller 34 that is connected to and operates a fuel line moving mechanism such as a conventional hydraulic or electronic servo mechanism as generally shown at 36.

In order to provide for this telescopic arrangement of fuel line sections and yet provide adequate volume of fuel to the combustion chamber 12, the fuel line section 28 is preferably formed of a straight conduit section of a sufficient length to receive the fuel line section 26 and is preferably of a larger diameter than needed for the delivery of the required fuel so as to assure adequate delivery of the fuel when the fuel line section 26 is inserted thereinto. The fuel line sections 26 and 28 may be readily connected into existing fuel lines by using conventional conduit coupling mechanisms.

Figure 6:
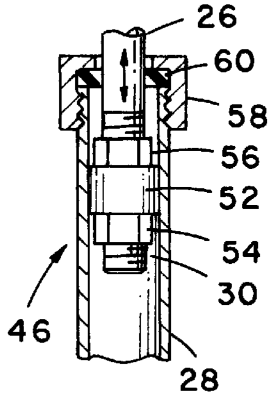
FIG. 6 is an enlarged fragmentary view taken along lines 6—6 of FIG. 5 showing details of a fuel-line tuning mechanism.
Figure 5:
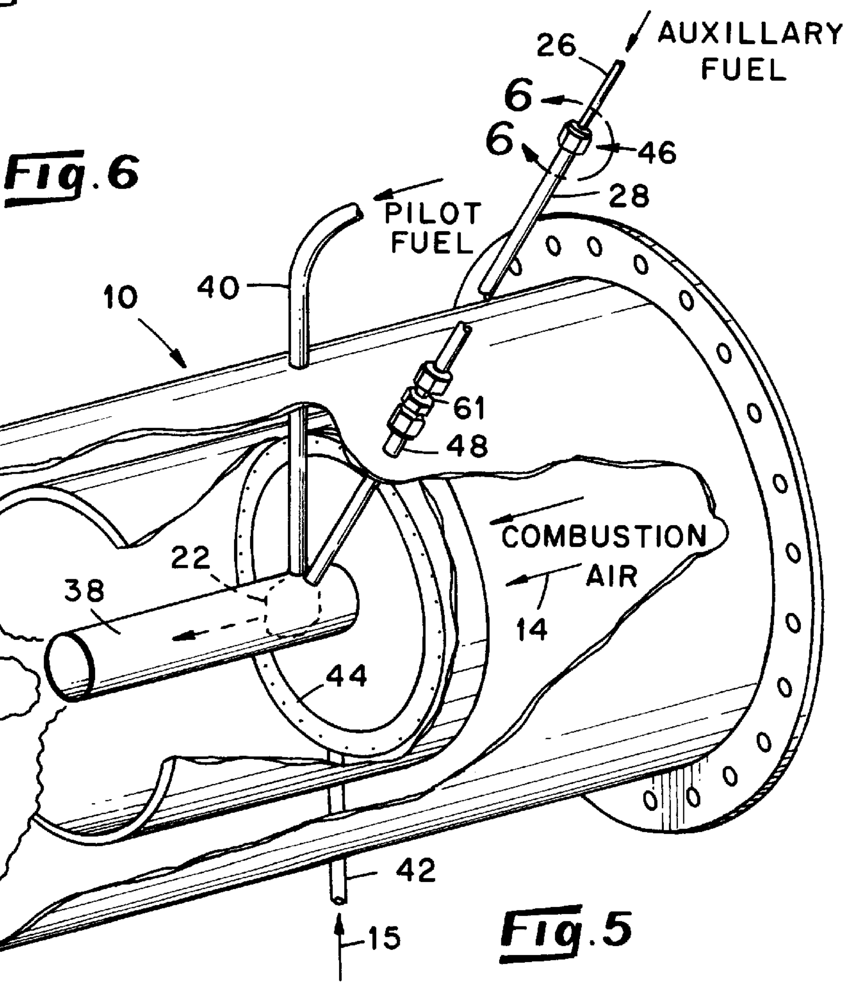
FIG. 5 is a schematic view of a combustion system filled with one embodiment of the present invention where an auxiliary fuel-delivery line associated with a pilot chamber is tunable in accordance with the present invention to provide for the transport of fuel-rich regions to the oscillating flame front in the combustion chamber each time when the pressure of each oscillation is in a low phase.

With reference to FIGS. 5 and 6, one embodiment of the telescopic fuel line sections 26 and 28 is shown being utilized in conjunction with an auxiliary fuel stream used for the production and maintenance of a pilot flame. As shown, the combustion system 10 comprises a pilot chamber 38 as defined by an open-ended tube for receiving and transporting therethrough a portion of the air stream 14 needed for supporting a pilot flame, a pilot fuel line 40 for introducing a stream of pilot fuel into the pilot chamber 38 for admixture with the pilot air therein and the transport of this mixture to the combustion zone 20. The main fuel for the operation of the combustion chamber is shown being conveyed through fuel line 42 and injected from a ring-type injector 44 into the main air stream 14 for conveyance into the combustion zone 20. The tunable fuel supply or injection arrangement 46 of the present invention is shown coupled to an auxiliary pilot fuel line 48 connected to the pilot chamber whereby the fuel discharged from pilot fuel line 40 and from the auxiliary pilot fuel line 48 together provide the quantity of fuel required to establish and maintain the pilot flame used in the operation of the combustion chamber 12.

As shown in FIG. 6, the tunable fuel injection arrangement 46 is constructed of conduit sections 26 and 28 with the telescopic displacement of the conduit section 26 being provided in either direction within conduit section 28 by using manual means or by using an automatic control arrangement such as shown in FIG. 3. This displacement of conduit section 26 acts to decrease or increase the fuel-containing length within conduit section 28 for acoustically tuning the fuel-delivery conduit in order to provide for the desired production and transport of the flame-stabilizing fuel-rich pulses or regions to the oscillating flame front at the desired time. Any suitable conventional fluid-tight seal construction can be utilized between the sliding conduit sections 26 and 28. For example, a relatively simple sealing arrangement such as provided by a compressible seal 52 of a suitable deformable, fuel-resistant polymeric material placed about an end portion of conduit section 26 between two nut-like rings 54 and 56 that are threadedly attached to the conduit section 26. The diameter of seal 52 can be readily adjusted by turning one or both of the threaded nut-like rings 54 and 56 on the conduit section 26 to provide a fuel-tight seal between contiguous surfaces of the relatively moveable conduit sections 26 and 28. A nut 58 containing a deformable fuel-resistant seal 60 is shown threadedly attached to the end of conduit section 28 for providing an additional seal between the conduit sections 26 and 28 as well as for defining a guide to facilitate the telescopic displacement of tube section 26 within tube section 28. Also, as shown, the relatively large diameter conduit section 28 is coupled to the fuel line 48 by a conventional connector arrangement as shown at 61.

During operation of the combustion system 10 illustrated in FIG. 5, especially if operated under lean pre-mix conditions, an unstable oscillating flame front such as indicated by line 62 will be produced causing the generation of undesirable high amplitude, high pressure oscillations. However, by selectively positioning the smaller diameter fuel line section 26 within the larger diameter fuel line section 28, the hard surface region 30 effectively changes the total volume or cross-sectional area within the fuel line 28 to alter the effect the combustion oscillations have upon the fuel contained within the fuel line 48. Thus, by so tuning the fuel line 48, the volume of fuel injected therefrom along with the fuel from pilot line 40 into the pilot air produces a fuel-rich region as generally shown at 22 for displacement thereof from the pilot chamber into the flame front 62 for the burning of the fuel-rich region when pressure in the combustion chamber 12 is at a relatively low level. The burning of successively introduced fuel-rich regions 22 stabilizes the oscillating flame front 62 to form a new, more stable flame front as indicated at line 66. The restructuring or moving of the flame front 62 by selectively altering the transport time of the fuel-rich region to the flame front 62 decouples the pressure and heat release parameters to reduce amplitude of the oscillations. The reduction of the oscillating amplitude is greater with increasing separation of the in-phase relationship of the pressure wave to the periodic heat release. The extent of the flame restructuring and repositioning of the flame front 62 is directly dependent upon the combination of the frequency of injection of the fuel-rich pulses, the duration of each fuel-rich pulse, and the equivalence ratio of the fuel-rich mixture.

Figure 7:
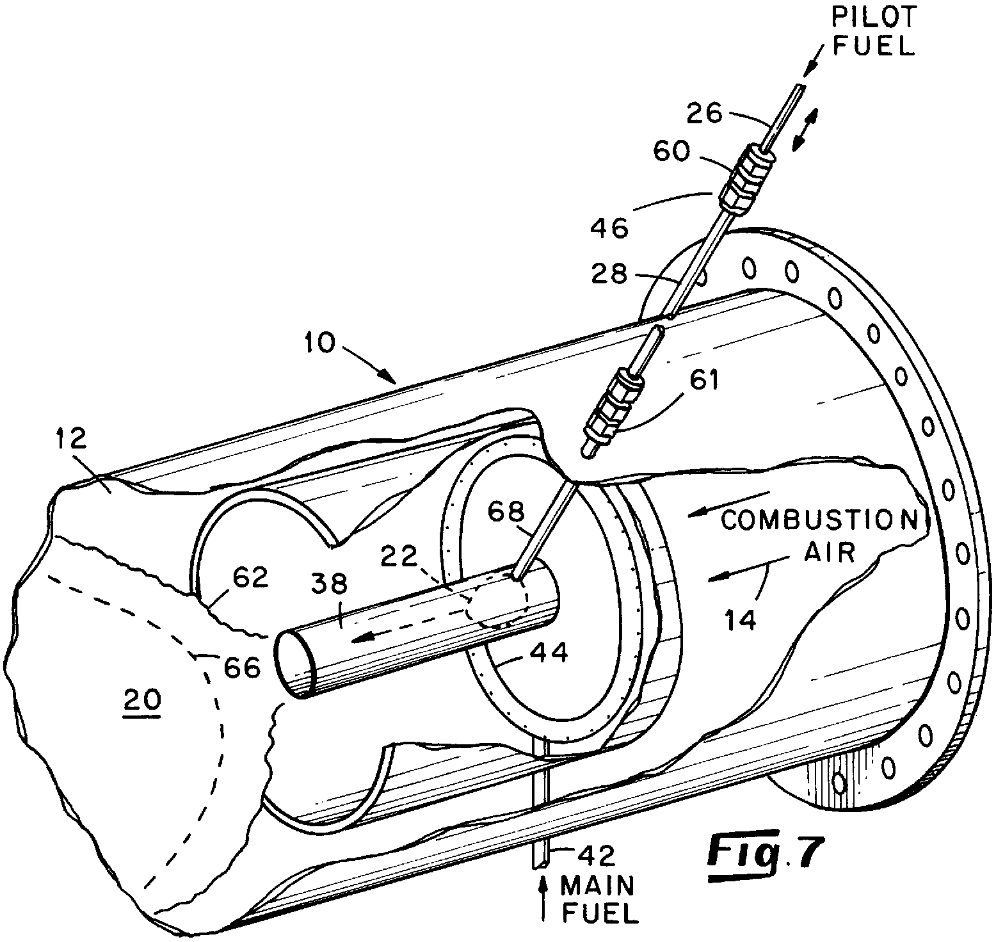
FIG. 7 is a fragmentary view illustrating a combustion system provided with another embodiment of the present invention wherein the pilot fuel-delivery means is tuned in accordance with the present invention so as to provide a fuel-rich region of the pilot fuel at the oscillating flame front when the pressure of the oscillation is at its lower or lowest value.

FIG. 7 illustrates an embodiment of the present invention wherein the tunable fuel-delivery apparatus 46 is coupled into and forms part of fuel-delivery line 68 used to supply all of the fuel to the pilot chamber 38 of the combustion system 10.

Figure 8:
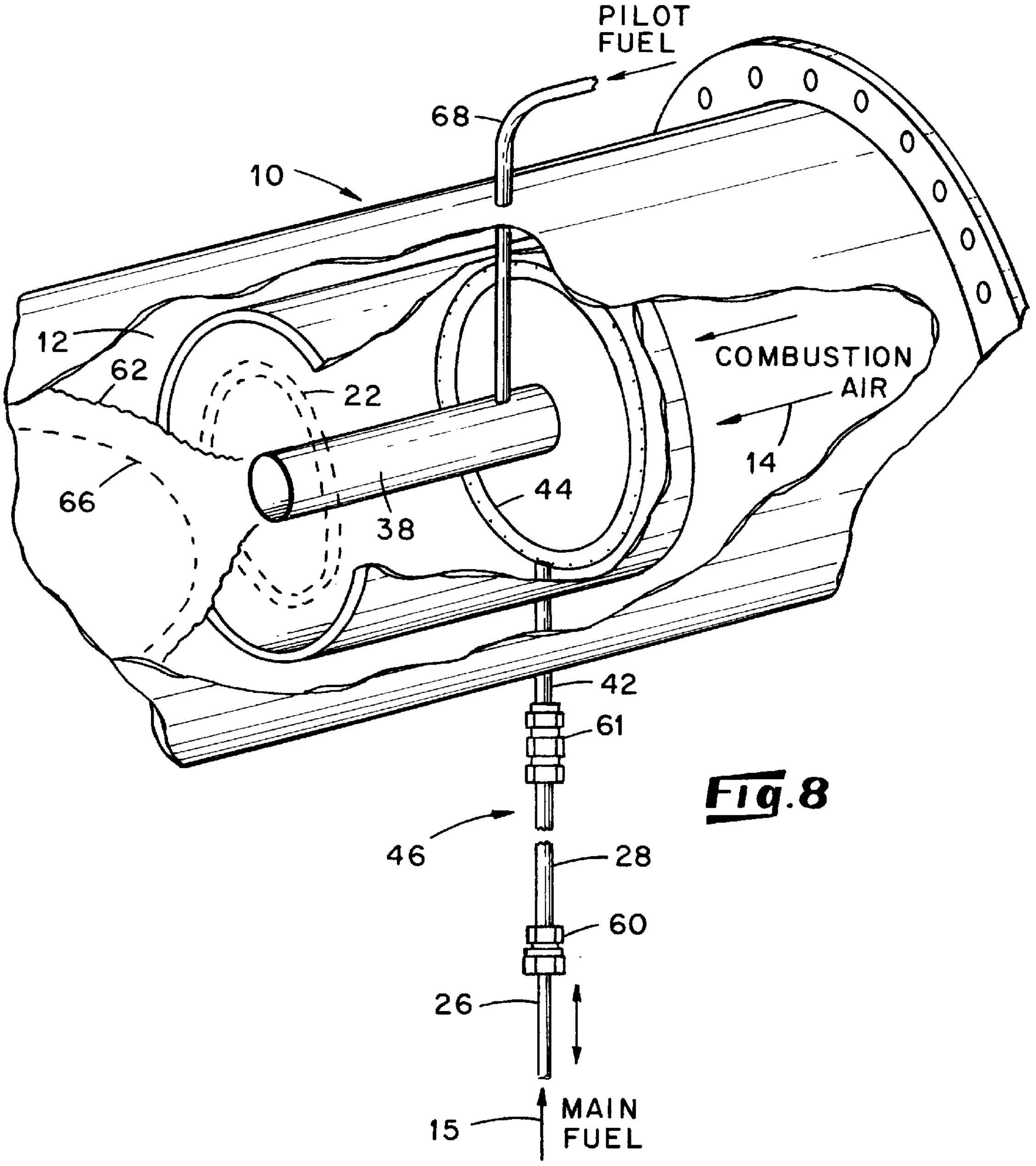
FIG. 8 is a fragmentary view of yet another combustion system which is provided with a further embodiment of the present invention wherein the primary or main fuel-delivery line to the combustion chamber is acoustically tunable in accordance with the present invention.

FIG. 8 is directed to a further embodiment of the present invention wherein the tunable fuel-delivery apparatus 46 is coupled into and provides a section of the fuel-delivery line 42 utilized as the main fuel supply for the combustion system 10.

Figure 9:
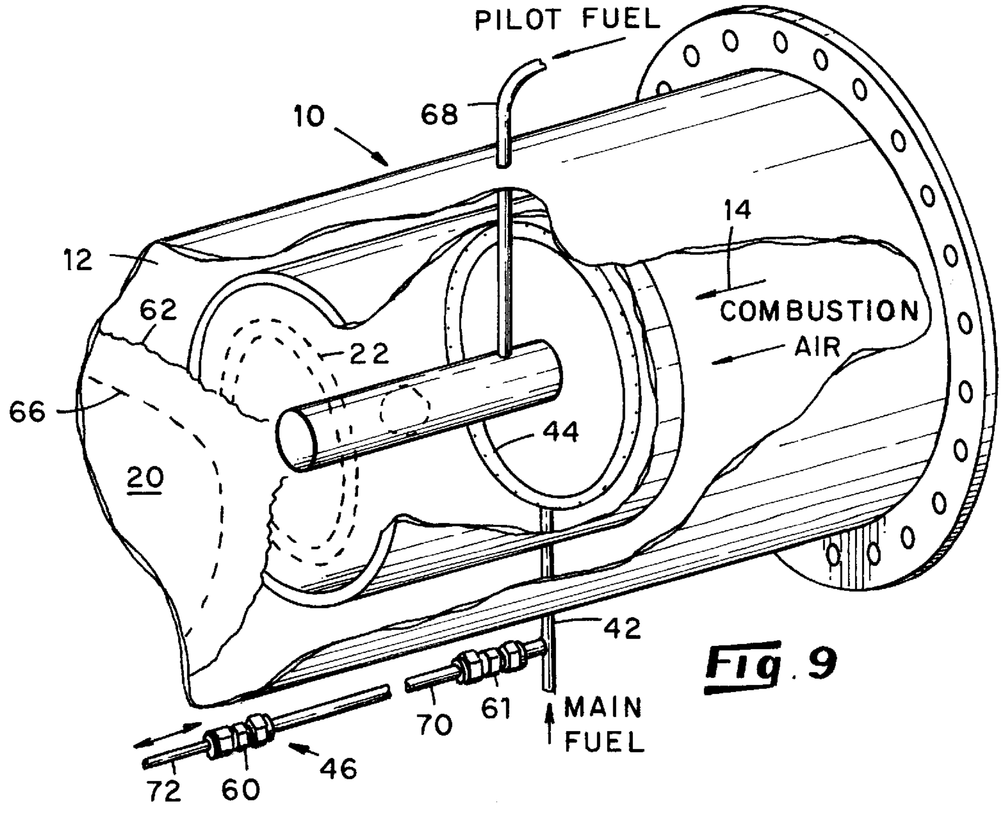
FIG. 9 is a fragmentary view of a further combustion system provided with another embodiment of the present invention wherein the tuning mechanism for the primary fuel-delivery line is attached to the side of the fuel-delivery line at a location adjacent to the combustion chamber so as to tune the fuel-delivery line to the selected frequency without requiring the passage of fuel through the tuning mechanism as in the embodiments of FIGS. 3 and 5–8.

While each of the above-described embodiments of the present invention show the tunable fuel-delivery apparatus 46 coupled directly into and forming a segment or section of the fuel-delivery lines connected to the pilot chamber or to the main fuel injector, the tunable fuel-delivery arrangement of the present invention can also be coupled indirectly to and interact with any of these fuel-delivery lines. For example, as illustrated in FIG. 9, tunable fuel injection in accordance with the present invention is provided by coupling a non-fuel conveying conduit 70 to the main fuel line 42 at a location thereon near the fuel injector 44. The volume or cross-sectional area of conduit 70 is included in and provides a substantial portion of the total cross-sectional area of the portion of the fuel line 42 that is subjected to combustion chamber oscillations. Thus, a change in the cross-sectional area within conduit 70 directly changes or alters the total cross-sectional area within the contiguous portion of the fuel-delivery line 42 so as to provide for acoustic tuning of the fuel-delivery line for effecting combustion oscillation control as in the previously described embodiments of the present invention. In the FIG. 9 embodiment the cross-sectional area of conduit 70 is readily increased or decreased by using a telescoping tube arrangement as described above, except that the smaller diameter tube 72 may be plugged or formed of a solid rod since it is non-fuel bearing.

The utilization of the embodiment depicted in FIG. 9 is advantageous since the tunable fuel-delivery apparatus 46 may be readily coupled to the desired fuel-delivery line of the combustion system without removing and replacing a section of the fuel line with a larger diameter conduit section for the practice of the present invention.

Some prior combustion control techniques, such as that described in the aforementioned article by V. I. Hanby ("Convective Heat Transfer in a Gas-Fires Pulsating Combustor", *I. of Engineering for Power,* January, 1969, pp. 48–52) tune the acoustic behavior of the combustion chamber by employing tuning mechanisms mounted directly on the combustion chamber walls and which are exposed to the hot combustion gases and also change the configuration of the combustion chamber. The present invention, on the other hand, controls the oscillation characteristics of the combustor by employing relatively inexpensive hardware that is associated with the fuel-delivery line at locations remote to the hot combustion chamber walls and the hot gases therein. Also, existing combustion systems can be readily fitted with tunable fuel injection systems of the present invention.

It will also be seen that by using the tunable fuel injection system of the present invention, combustion system operators can select the level of oscillation necessary to achieve improved emissions performance by simply monitoring the emissions and the appropriately positioning conduit section 26 in conduit section 28 so as to promote a small level of oscillation while optimizing the emissions. Further, the present invention permits the operation of combustion systems under load conditions that may otherwise produce unacceptably large oscillations.

What is claimed is:

1. Apparatus for reducing the amplitude of dynamic pressure oscillations occurring in a combustion system comprising a combustion chamber having a combustion zone with opposite end regions, means for conveying a stream of an oxidizer in gaseous form into the combustion zone at one end region thereof, and at least one fuel-delivery conduit means having a cross-sectional area for containing fuel and providing for the injection of at least one stream of fuel into at least a portion of the stream of the oxidizer for forming at least one admixture therewith and the introduction of one of said at least one admixture into the combustion zone at said one end region wherein said one of at least one admixture is burned, said burning producing an oscillating flame front within the combustion zone at a location intermediate said end regions and defining dynamic pressure oscillations within the combustion chamber and in one of said at least one fuel-delivery conduit means for producing oscillations in the rate of fuel flow injected from the at least one fuel-delivery conduit means into at least a portion of the stream of oxidizer, said apparatus comprising movable tuning means coupled to said one of said at least one fuel-delivery conduit means for changing the effective length of a segment of said one of at least one fuel-delivery conduit means subjected to the pressure oscillations for providing a change in the cross-sectional area of said of one at least one of the fuel delivery conduit means sufficient to alter the phase of the oscillations produced in the fuel in said one fuel-delivery conduit means to a selected phase capable of providing a fuel-rich region of a fuel-air mixture at said one end of the combustion zone at a time when the pressure of each of the pressure oscillations is at a relatively low pressure.

2. Apparatus for reducing the amplitude of dynamic pressure oscillations occurring in a combustion system as claimed in claim 1, wherein means responsive to the pressure of the oscillations in the combustion zone are coupled to the movable tuning means for effecting the movement thereof.

3. Apparatus for reducing the amplitude of dynamic pressure oscillations occurring in a combustion system as claimed in claim 1, wherein said combustion system includes pilot chamber means, and wherein said one of said at least one fuel-delivery conduit means is a fuel line coupled to said pilot chamber means.

4. Apparatus for reducing the amplitude of dynamic pressure oscillations occurring in a combustion system as claimed in claim 1, wherein said one of said at least one fuel-delivery conduit means conveys at least a major portion of the fuel to be burned in the combustion chamber.

5. Apparatus for reducing the amplitude of dynamic pressure oscillations occurring in a combustion system as claimed in claim 1, wherein the movable tuning means forms a portion of said segment of said one of said at least one fuel-delivery conduit means and comprises first and second tubing means with the second tubing means having a section thereof telescopically receivable within a section of the first tubing means, surface means disposed between the telescoped sections of the first and second tubing means, and means for translating at least the surface means within the section of the first tubing means for changing the effective length thereof and thereby altering the phase of the oscillations in said one of said at least one fuel-delivery conduit means to said selected phase.

6. Apparatus for reducing the amplitude of dynamic pressure oscillations occurring in a combustion system as claimed in claim 1, wherein the movable tuning means comprises first and second tubing means coupled to said segment of said one of said at least one fuel-delivery conduit means and defining a portion of the total cross-sectional area of said one of said at least one fuel-delivery conduit means, second tubing means having a section thereof telescopically receivable within a section of the first tubing means, surface means disposed between the telescoped sections of the first and second tubing means, and means for translating at least the surface means within the section of the first tubing means for changing cross-sectional area thereof and thereby altering the phase of the oscillations of in the fuel in said one of said at least one fuel-delivery conduit means to said selected phase.

7. In the operation of a combustion system comprising a combustion chamber having a combustion zone with opposite end regions and at least one fuel-delivery conduit means containing fuel and oxidizer delivery means adapted to form and introduce at least one mixture of fuel and at least a portion of the oxidizer into the combustion zone at one end region thereof for the combustion of the at least one mixture of the fuel and oxidizer and the generation of an oscillating flame front within the combustion zone at locations intermediate said end regions which effects the formation of dynamic pressure oscillations within the combustion zone and fluid oscillations of substantially corresponding frequencies in the fuel in one of said at least one fuel-delivery conduit means which cause fluctuations in the rate of fuel flow discharged from the said one of said at least one fuel-delivery conduit means for admixture with at least a portion of the oxidizer, a method for reducing the amplitude of the pressure oscillations in the combustion zone comprising the step of selectively varying the effective length of a section of said one of said at least one fuel-delivery conduit means at a location thereof subject to said fluid oscillations to change the cross-sectional area of said section for changing the phase of the fluid oscillations produced in the fuel in said one of said at least one fuel-delivery conduit means to a selected phase sufficiently different from the phase of the oscillations in the combustion zone so that a fuel-rich region of at least one fuel-air mixture is produced for introduction into said one end of the combustion zone each time the pressure of the pressure oscillation in the combustion zone is at a relatively low pressure.

8. In the method for reducing the amplitude of pressure oscillations occurring during the operation of a combustion system as claimed in claim 7, wherein the selective varying of the effective length of said section is achieved by the translation of a phase-altering solid member within said section.

9. In the method for reducing the amplitude of pressure oscillations occurring during the operation of a combustion system as claimed in claim 7, wherein the selective varying of the effective length of said section is achieved by the translation of a phase-altering solid member in a non-fuel conveying volume openly coupled to said section.

* * * * *